(12) United States Patent
Liu et al.

(10) Patent No.: US 8,295,060 B2
(45) Date of Patent: Oct. 23, 2012

(54) MOUNTING APPARATUS AND SYSTEM FOR PCI CARD

(75) Inventors: Lei Liu, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/859,505

(22) Filed: Aug. 19, 2010

(65) Prior Publication Data

US 2011/0249397 A1    Oct. 13, 2011

(30) Foreign Application Priority Data

Apr. 8, 2010  (CN) .......................... 2010 1 0142545

(51) Int. Cl.
*H05K 7/14* (2006.01)
(52) U.S. Cl. .................. 361/800; 361/810; 174/520
(58) Field of Classification Search .................. 361/800, 361/807, 810; 174/520
See application file for complete search history.

(56) References Cited

U.S. PATENT DOCUMENTS

| | | | | |
|---|---|---|---|---|
| 4,979,075 A * | 12/1990 | Murphy | .................. | 361/679.32 |
| 5,338,214 A * | 8/1994 | Steffes et al. | ................. | 439/160 |
| 5,496,181 A * | 3/1996 | Addison et al. | ................. | 439/61 |
| 5,579,210 A * | 11/1996 | Ruhland et al. | ................. | 361/816 |
| 5,831,821 A * | 11/1998 | Scholder et al. | ......... | 361/679.32 |
| 6,118,668 A * | 9/2000 | Scholder et al. | ............. | 361/753 |
| 6,275,389 B1 * | 8/2001 | Huang et al. | ................. | 361/807 |
| 6,618,260 B2 * | 9/2003 | Willis et al. | ................. | 361/752 |
| 6,618,264 B2 * | 9/2003 | Megason et al. | ............. | 361/759 |
| 7,359,216 B2 * | 4/2008 | Hall | ............................. | 361/796 |
| 7,499,285 B2 * | 3/2009 | Chen et al. | .................... | 361/752 |
| 7,525,815 B2 * | 4/2009 | Chen et al. | .................... | 361/788 |
| 7,645,144 B2 * | 1/2010 | Tzeng et al. | .................. | 439/65 |
| 7,990,732 B2 * | 8/2011 | Kuo et al. | ..................... | 361/754 |

* cited by examiner

*Primary Examiner* — Lisa Lea Edmonds
(74) *Attorney, Agent, or Firm* — Altis Law Group, Inc.

(57) ABSTRACT

A mounting apparatus includes a mounting member and a bracket. The mounting member includes a base piece and a latch piece located on the base piece. The latch piece is configured for securing a riser card. The bracket is configured for securing a PCI card, which is electronically coupled to the riser card. The bracket is secured to the base piece and the latch piece.

20 Claims, 7 Drawing Sheets

MOUNTING APPARATUS AND SYSTEM FOR PCI CARD

BACKGROUND

1. Technical Field

The present disclosure relates to a mounting apparatus and a system for peripheral component interconnect (PCI) card.

2. Description of Related Art

A plurality of PCI cards can be provided in a computer system to improve functions of the computer system. A mounting apparatus to conveniently secure the PCI cards in the computer system is required, therefore there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
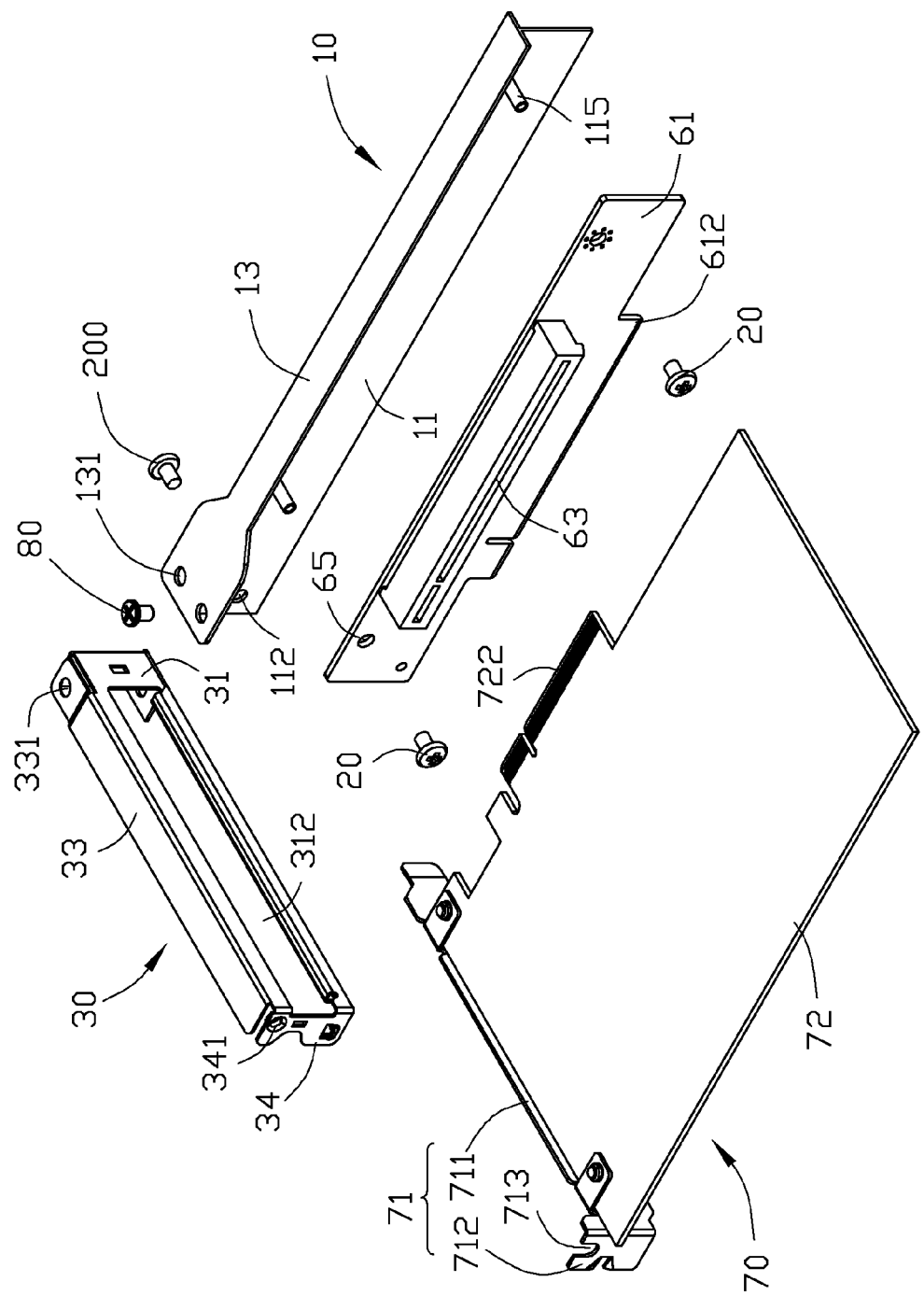
FIG. 1 is an exploded view of a mounting apparatus and a PCI card in accordance with an embodiment.

Referring to FIG. 1, a mounting apparatus is configured for securing a first Peripheral Component Interconnect (PCI) card 70. The first PCI card 70 includes a card body 72 and a mounting piece 71 fixed to the card body 72. The card body 72 includes an inserting portion 722 configured for electrically coupling with a first riser card 60. The mounting piece 71 includes a mounting portion 711 and a bent portion 712 connected to the mounting portion 711. The mounting portion 711 is fixed to the card body 72. A mounting hole 713 is defined in the bent portion 712. In one embodiment, the bent portion 712 is substantially perpendicular to the mounting portion 711.

The first riser card 60 includes a main body 61 and a socket 63 located on the main body 61. The main body 61 includes a connecting portion 612. Two card holes 65 are defined in the main body 61 on opposite sides of the socket 63. The socket 63 is configured to receive the inserting portion 722 of the first PCI card 70.

The mounting apparatus, in accordance with an embodiment, includes a mounting member 10 configured for securing the first riser card 60 and a first bracket 30 configured for being secured to the mounting member 10.

The mounting member 10 includes a base piece 11 and a latch piece 13 located on the base piece 11. Two mounting posts 115, each with a fixing hole, are located on the base piece 11. A through hole 112 is defined in the base piece 11 at one side of the two mounting posts 115. Two locking holes 131 are defined in the latch piece 13 adjacent to the through hole 112. In one embodiment, the latch piece 13 is substantially perpendicular to the base piece 11, the mounting member 10 has a T-shaped cross section, and the two locking holes 131 are positioned at two sides of the base piece 11.

Figure 2:
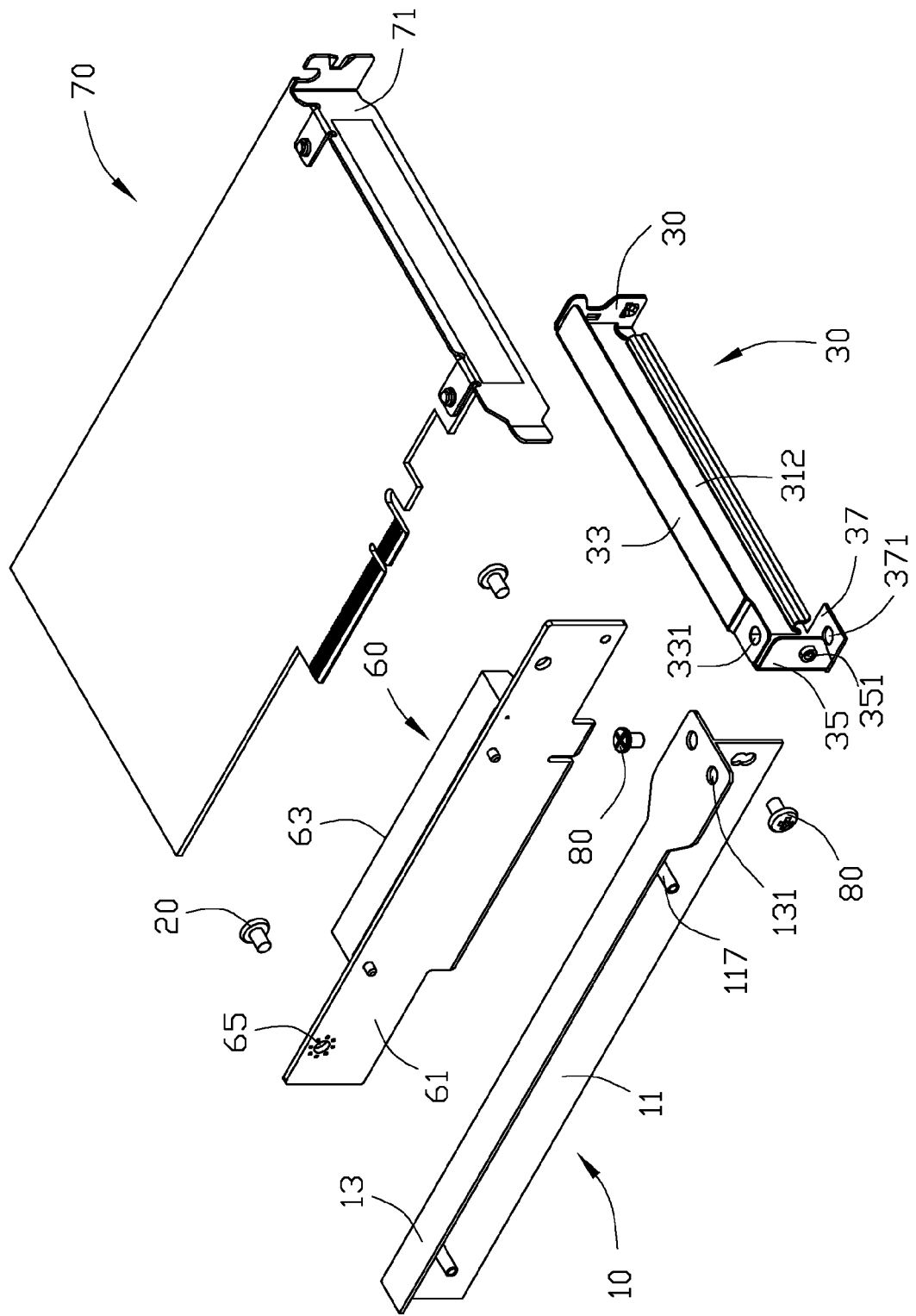
FIG. 2 is similar to FIG. 2, but viewed from a different aspect.

Referring to FIGS. 1-2, the first bracket 30 includes a base wall 31, a first sidewall 33, a second sidewall 34, a third sidewall 35 and a fourth sidewall 37. The first through fourth sidewalls 33, 34, 35, 37 are located on four edges of the base wall 31. The first and fourth sidewalls 33, 37 are located between the second and third sidewalls 34, 35. A through opening 313 is defined in the base wall 31. A fastening hole 351 is defined in the third sidewall 35. A positioning hole 331, adjacent to the fourth sidewall 37, is defined in the first sidewall 33. A screw hole 341 is defined in the second sidewall 34. A securing hole 371, aligned with the positioning hole 331, is defined in the fourth sidewall 37. In one embodiment, the first to fourth sidewalls 33, 34, 35, 37 are substantially perpendicular to the base wall 31, and the first and fourth sidewalls 33, 37 are substantially perpendicular to the second and third sidewalls 34, 35.

Figure 4:
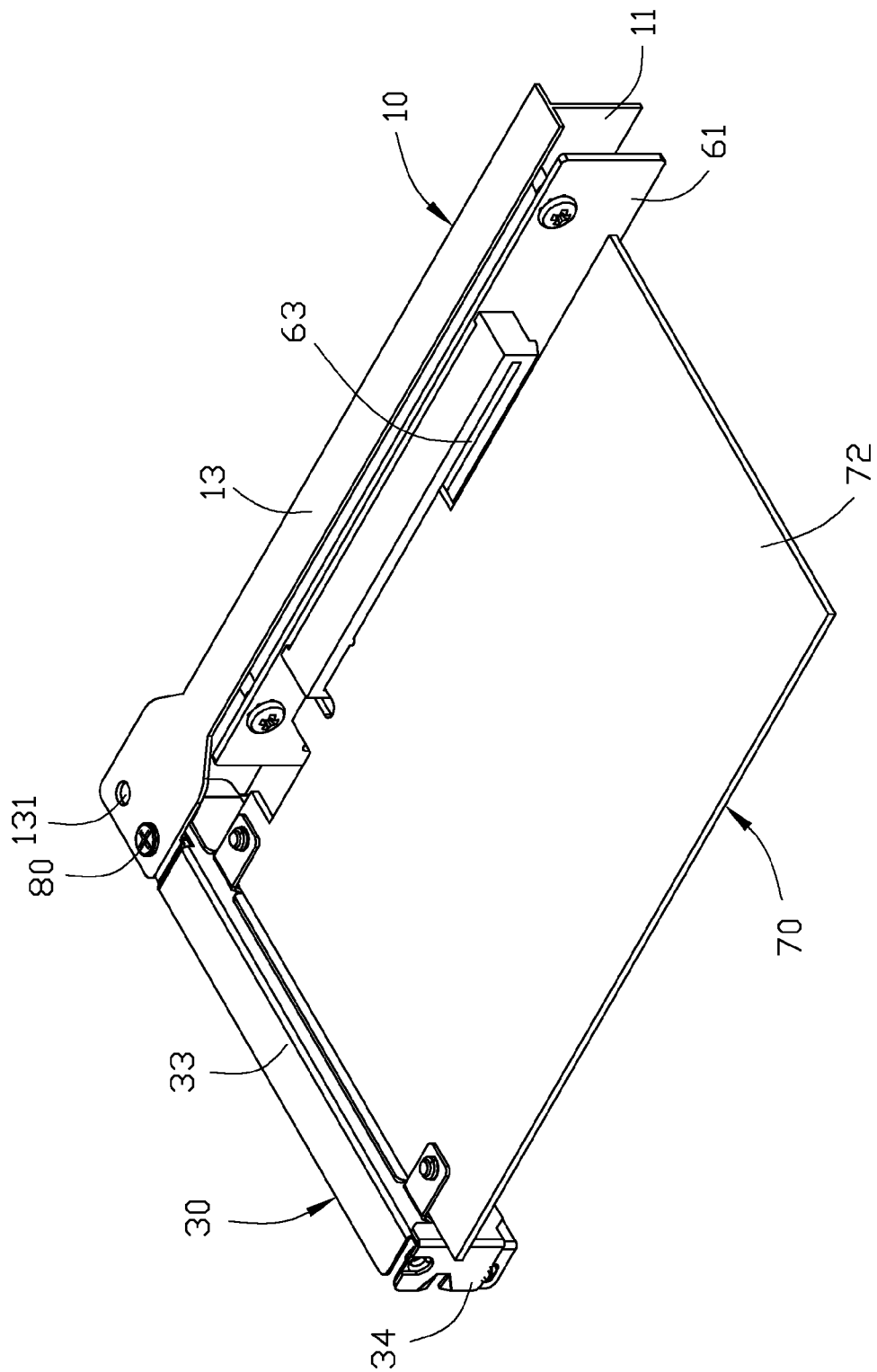
FIG. 4 is an assembled view of the mounting apparatus of FIG. 1.

Referring to FIGS. 1 and 4, in assembly, the first bracket 30 is placed on the mounting member 10. The base wall 31 is substantially adjacent to the mounting posts 115 of the base piece 11. The first sidewall 33 abuts the latch piece 13 and is substantially perpendicular to the base piece 11. The third sidewall 35 abuts the base piece 11. The positioning hole 331 is aligned with the locking hole 131, and a first fastener 80, such as a screw, is secured in the positioning hole 331 and the locking hole 131 to fix the first bracket 30 to the mounting member 10. The fastening hole 351 of the third sidewall 35 is aligned with the through hole 112 of the base piece 11, and a second fastener 200, such as a screw, is secured in the through hole 112 and the fastening hole 351, to secure the third sidewall 35 to the base piece 11. To fix the first riser card 60 to the mounting member 10, the mounting posts 115 are inserted into the card holes 65 of the first riser card 60, and two third fasteners 20, such as screws, are secured in the fixing holes of the mounting posts 115. The inserting portion 722 of the first PCI card 70 is inserted into the socket 63 of the first riser card 60, and the mounting piece 71 is located on the first bracket 30. The bent portion 712 of the mounting piece 71 abuts the second sidewall 34 of the first bracket 30, and the mounting portion 711 abuts the base wall 31 of the first bracket 30. Therefore, the first PCI card 70 is secured to the first riser card 60 by the mounting member 10 and the first bracket 10.

Figure 5:
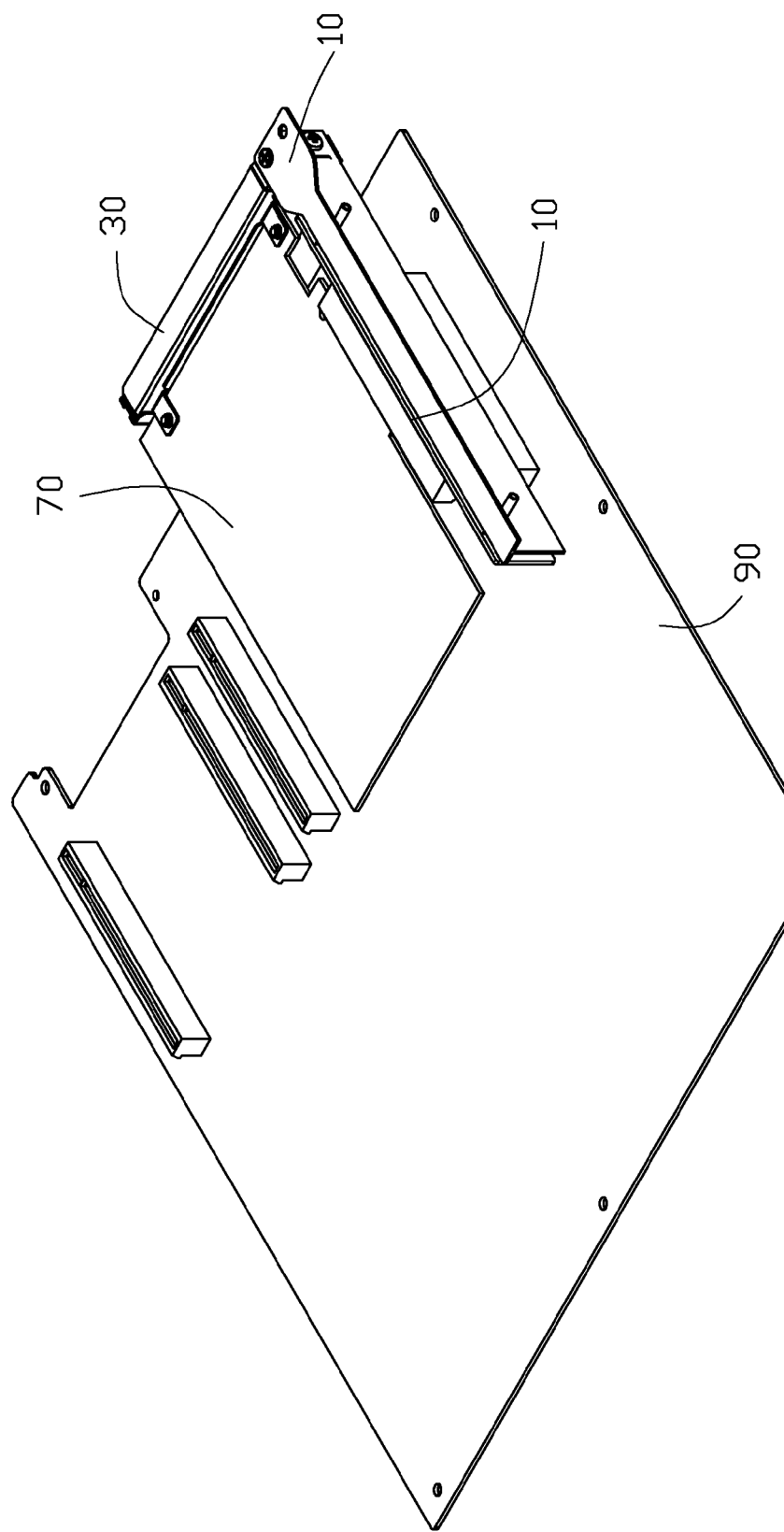
FIG. 5 is an assembled view of the mounting apparatus of FIG. 2, and shows the PCI card secured to a motherboard.

Referring to FIG. 5, the connecting portion 612 of the first riser card 60 is inserted into a PCI socket 91 of a motherboard 90, to secure the first PCI card 70 to the motherboard 90.

Figure 3:
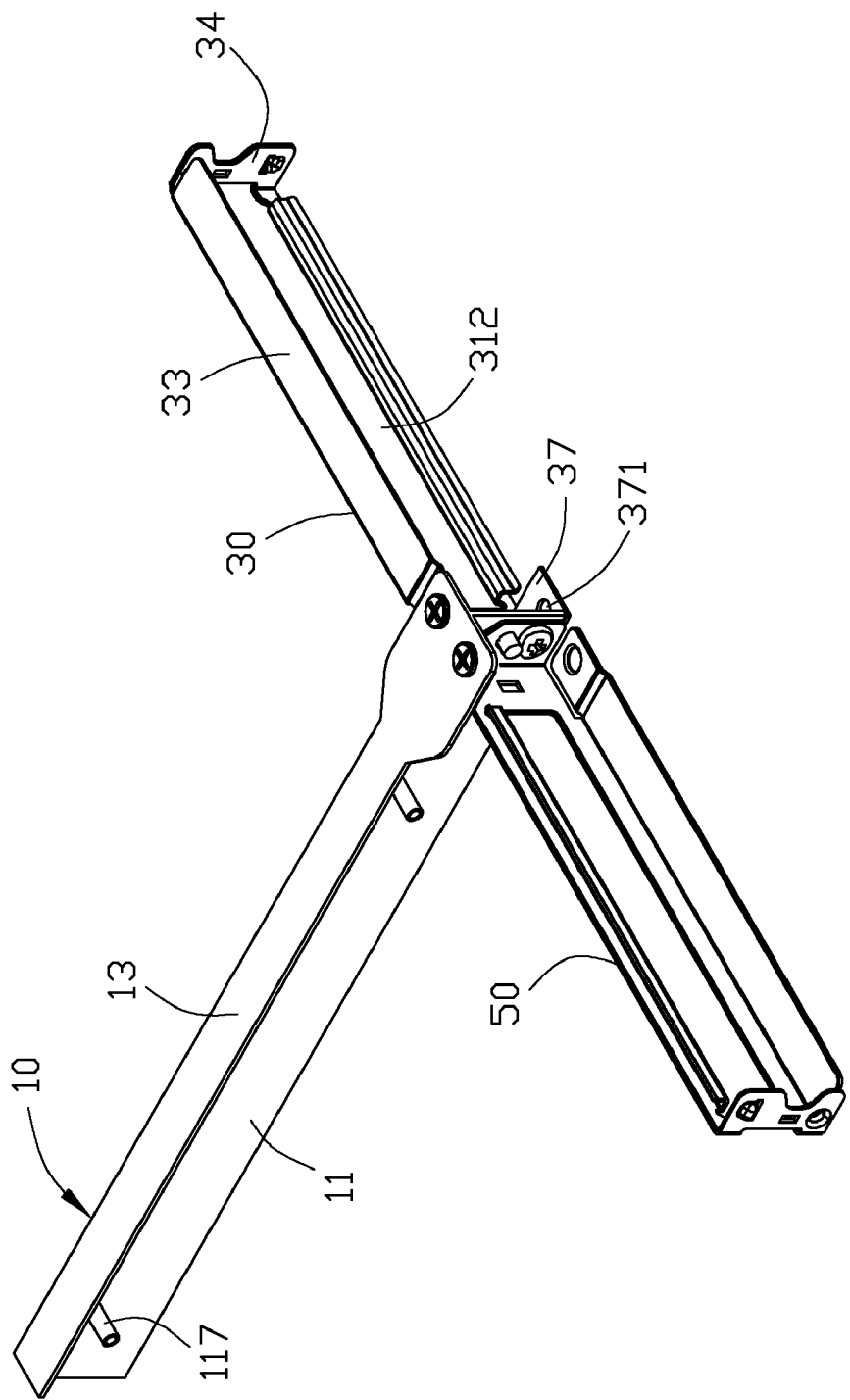
FIG. 3 is an assembled view of a mounting member and two brackets of the mounting apparatus in accordance with an embodiment.
Figure 6:
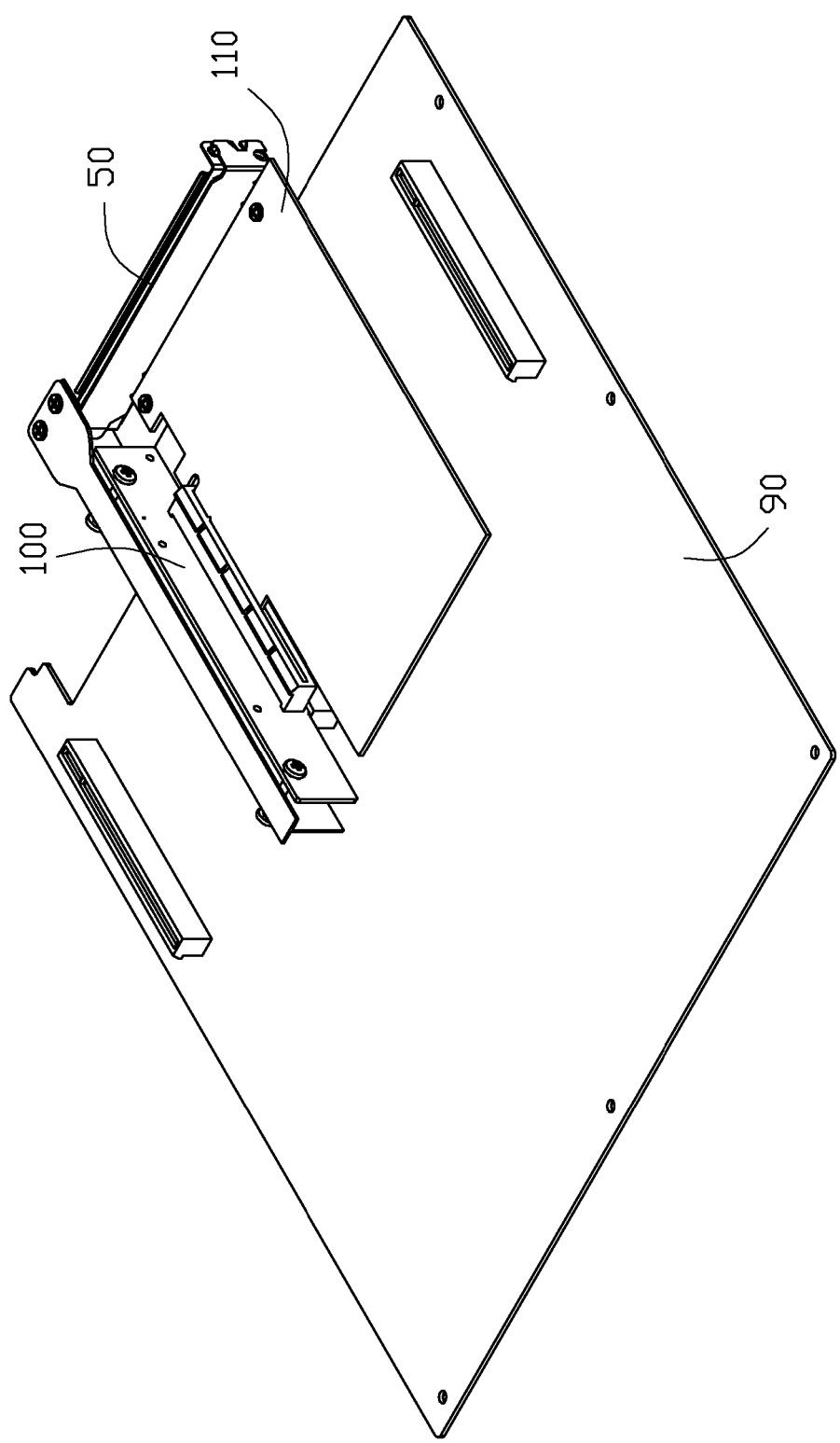
FIG. 6 is similar to FIG. 5, but showing the PCI card secured to a different position of the motherboard.
Figure 7:
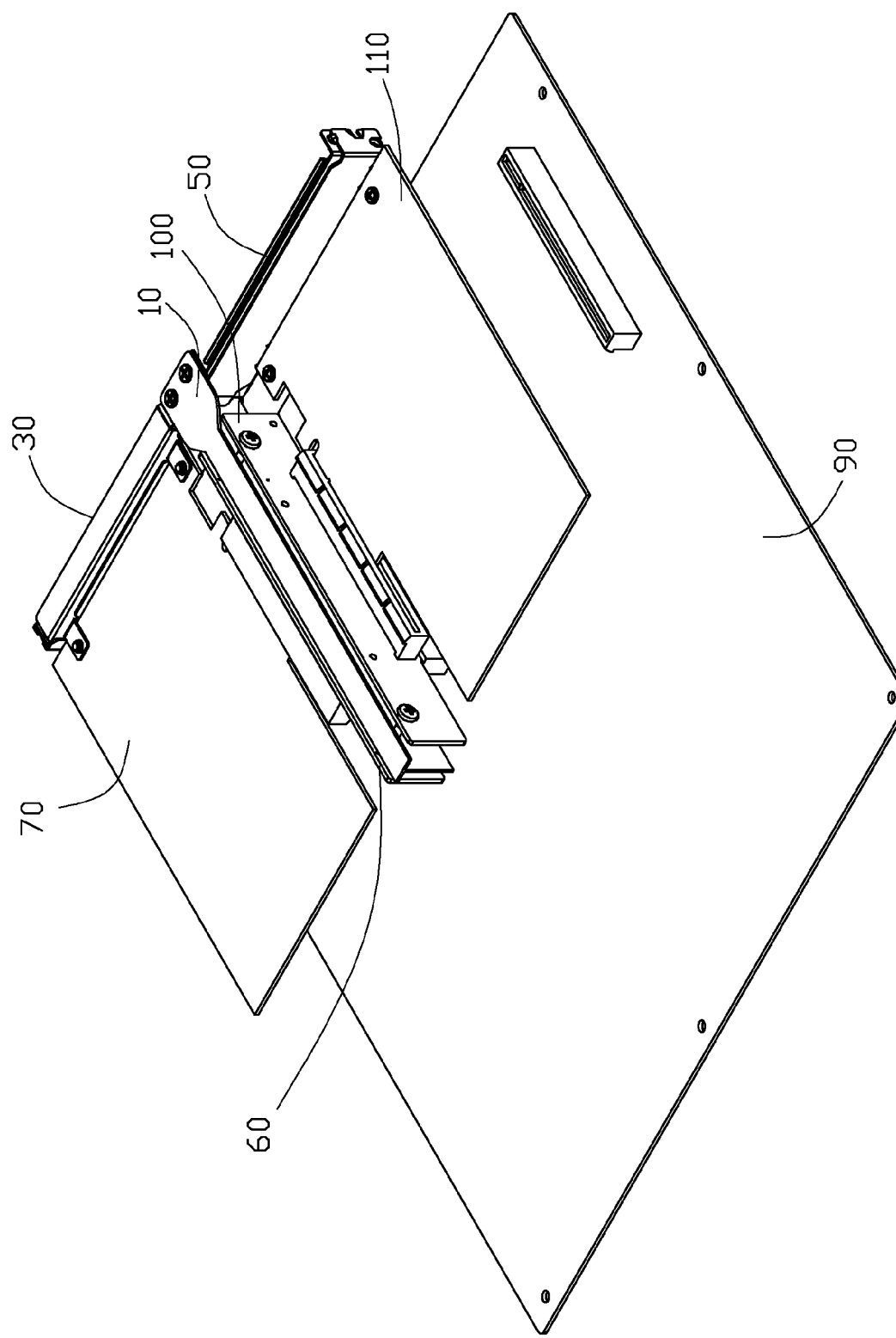
FIG. 7 is an assembled view of the mounting apparatus, two PCI cards, two riser cards and the motherboard in accordance with an embodiment.

Referring to FIG. 3, a second bracket 50 can be secured to the mounting member 10 on a side opposite to the first bracket 30. The structure of the second bracket 50 is the same as the first bracket 30. Referring to FIG. 7, a second PCI card 110 can be secured to a second riser card 100 by the mounting member 10 and the second bracket 50. Referring to FIG. 6, only the second bracket 50 is shown to be secured to the mounting member 10, to secure the second PCI card 110 to the second riser card 100. Referring to FIGS. 5-7, it is known that the first bracket 30 and/or the second bracket 50 are/is secured to the mounting member 10 according to the position of the PCI socket 91 on the motherboard 90.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a mounting member comprising a base piece, two mounting posts protruding from two opposite side surfaces of the base piece, and a latch piece located on the base piece; and
   a bracket, for securing a peripheral component interconnect (PCI) card electronically coupled to the riser card, and the bracket is secured to the base piece and the latch piece;
   wherein each of the two mounting posts is configured for securing a riser card.

2. The mounting apparatus of claim 1, wherein the latch piece is substantially perpendicular to the base piece.

3. The mounting apparatus of claim 1, wherein the mounting member has a T-shaped cross section.

4. The mounting apparatus of claim 1, wherein the bracket comprises a base wall, a first sidewall, and a third sidewall; the first and third sidewalls are located on the base wall; the first sidewall is fixed to the latch piece; and the third sidewall is fixed to the base piece.

5. The mounting apparatus of claim 4, wherein the first sidewall is substantially perpendicular to the base piece and parallel to the latch piece; and the third sidewall is substantially perpendicular to the latch piece and parallel to the base piece.

6. The mounting apparatus of claim 4, wherein the first and third sidewalls are substantially perpendicular to the base wall.

7. The mounting apparatus of claim 4, wherein the bracket further comprises a second sidewall substantially perpendicular to the base wall and the first sidewall; and the second sidewall is configured for securing a mounting piece of the PCI card.

8. The system of claim 4, wherein the latching piece defines two locking holes positioned at opposite side surfaces of the base piece, and each of the two locking holes is configured to secure the first sidewall to the latching piece.

9. A mounting apparatus comprising:
   a mounting member configured for securing two riser cards on opposite sides; and
   two brackets, for securing two peripheral component interconnect (PCI) cards electronically coupled to the two riser cards; wherein the two brackets are secured to the mounting member on the opposite sides;
   wherein the mounting member comprises a base piece and a latch piece located on the base piece; the base piece is configured for securing the two riser cards on the opposite sides; and the two brackets are secured to the base piece on the opposite sides and the latch piece.

10. The mounting apparatus of claim 9, wherein the latch piece is substantially perpendicular to the base piece.

11. The mounting apparatus of claim 9, wherein the mounting member has a T-shaped cross section.

12. The mounting apparatus of claim 9, wherein each bracket comprises a base wall, a first sidewall, and a third sidewall; wherein the first and third sidewalls are located on the base wall, the first sidewall is fixed to the latch piece, and the third sidewall is fixed to the base piece.

13. The mounting apparatus of claim 12, wherein the first sidewall of each bracket is substantially perpendicular to the base piece and parallel to the latch piece; and the third sidewall of each bracket is substantially perpendicular to the latch piece and parallel to the base piece.

14. The mounting apparatus of claim 12, wherein the first and third sidewalls are substantially perpendicular to the base wall.

15. The mounting apparatus of claim 12, wherein each bracket further comprises a second sidewall substantially perpendicular to the base wall and the first sidewall; and the second sidewall is configured for securing a mounting piece of each PCI card.

16. The mounting apparatus of claim 9, wherein the two brackets and the mounting member form a T-shape.

17. The system of claim 9, wherein the latching piece defines two locking holes, and the two locking holes are positioned at opposite side surfaces of the base piece.

18. A system comprising:
   a motherboard;
   a first riser card electrically coupled to the motherboard;
   a second riser card electrically coupled to the motherboard;
   a mounting member secured to the first riser card;
   a first bracket secured to the mounting member;
   a first peripheral component interconnect (PCI) card secured to the first bracket and electrically coupled to the first riser card;
   a second PCI card; and
   a second bracket for securing the second PCI card to the second riser card;
   wherein the first PCI card is substantially parallel to the motherboard and perpendicular to the first riser card; and the first bracket, the second brackets and the mounting member form a T-shape.

19. The system of claim 18, wherein the mounting member comprises a base piece and a latch piece located on the base piece; the base piece is configured for securing the riser card; and the bracket is secured to the base piece and the latch piece.

20. The system of claim 19, wherein the latch piece is substantially perpendicular to the base piece; and the mounting member has a T-shaped cross section.

* * * * *